United States Patent
Inagaki et al.

(10) Patent No.: US 6,913,820 B2
(45) Date of Patent: Jul. 5, 2005

(54) POLYESTER FILM

(75) Inventors: Masashi Inagaki, Sakata-gun (JP); Masahiro Kita, Sakata-gun (JP)

(73) Assignee: Mitsubishi Polyester Film Corporation, Tokyo (JP)

( * ) Notice: Subject to any disclaimer, the term of this patent is extended or adjusted under 35 U.S.C. 154(b) by 49 days.

(21) Appl. No.: 10/213,332

(22) Filed: Aug. 6, 2002

(65) Prior Publication Data

US 2003/0124338 A1 Jul. 3, 2003

(30) Foreign Application Priority Data

| Aug. 10, 2001 | (JP) | ........................................ | 2001-244304 |
| Aug. 10, 2001 | (JP) | ........................................ | 2001-244305 |
| Aug. 16, 2001 | (JP) | ........................................ | 2001-247173 |
| Dec. 26, 2001 | (JP) | ........................................ | 2001-393791 |

(51) Int. Cl.$^7$ ........................... B32B 7/12; G02F 1/1335
(52) U.S. Cl. ................ 428/354; 428/317.7; 428/317.9; 428/319.3; 428/343; 428/480; 349/96
(58) Field of Search ........................... 349/96; 428/354, 428/343, 317.9, 317.7, 319.3, 480

(56) References Cited

U.S. PATENT DOCUMENTS

| 2003/0124338 | * | 7/2003 | Inagaki et al. | ........... 428/317.9 |
| 2003/0129327 | * | 7/2003 | Shibue et al. | ................. 428/1.1 |
| 2003/0151707 | * | 8/2003 | Kobayashi et al. | ........... 349/96 |

OTHER PUBLICATIONS

Jap Patent Abst Public No. 04–030120, Feb. 1992.*
Jap Patent Abst Public No. 59–005216, Jan. 1984.*

* cited by examiner

Primary Examiner—Daniel Zirker
(74) Attorney, Agent, or Firm—David G. Conlin; John B. Alexander; Edwards & Angell, LLP

(57) ABSTRACT

The present invention relates to a polarizing plate protective film base comprising a laminated film comprising a biaxially oriented polyester film and a coating layer provided on one side of said biaxially oriented polyester film, the surface resistance of said coating layer being not more than $1 \times 10^{11} \Omega$, the adhesive force (P2) of the coating layer surface with an acrylic adhesive being not more than 3,000 mN/cm, and the difference between adhesive force (P1) of the coating layer surface with a rubber adhesive and adhesive force (P2) with an acrylic adhesive (P1−P2) being not less than 100 mN/cm.

12 Claims, No Drawings

POLYESTER FILM

BACKGROUND OF THE INVENTION

The present invention relates to a polyester film. More particularly, it relates to a laminated film comprising a biaxially oriented polyester film and a coat with excellent scratch resistance, antistatic properties and slip characteristics, and a polarizing plate protective film base (support), a transfer medium and a heat transfer recording medium comprising the said laminated polyester film.

Among the plastic films, polyester films are popularly used in the various fields.

Presently, hard coated films produced by applying, drying and curing hard coat on polyester films (such as polyethylene terephthalate film) having useful properties such as high heat resistance, water resistance, chemical resistance and mechanical strength are prevalently used on the windows of automobiles and buildings for the purposes of light shield, prevention of scattering of glass on accidental break of the windows, etc. Such hard coated films, however, are defective in antistatic properties and slip characteristics, and tend to collect dust and dirt due to electric charging, thus posing the problems of poor handling qualities, etc., and the improvements over such problems have been desired.

A plastic film is used for surface protection of polarizing plate.

Usually, liquid crystal display panel comprises polarizing plates laminated on both sides of a liquid crystal cell containing liquid crystal sealed between two substrates. A protective film is applied on the surface of polarizing plate for preventing scratching or collection of dust thereon in the course of distribution or in assembling process of various types of display devices in computers, word processors, TV, and such. Such a protective film is removed as a disused article after it has served for the protection of polarizing plate. Usually, removal of the protective film is accomplished by pressing a rubber type adhesive tape against the protective film and lifting it up.

As usual, polyethylene films, ethylene-vinyl acetate copolymer films and such have been used as the said type of protective film. These films, however, had disadvantages in that the film must once be separated during testing and again attached after the test because the presence of such a film may disturb the practice of the tests involving optical evaluations of display panels concerning their display performance, hue, contrast, contamination, etc.

Japanese Patent Application Laid-Open (KOKAI) No. 4-30120 proposes a protective film which need not be separated during the test involving optical evaluations, and which comprises a photoisotropic base film having a photoisotropic adhesive resin layer laminated thereon. This protective film, however, is unsatisfactory in certain respects such as chemical resistance and scratch resistance because a film formed by casting with little orientation and having a state close to amorphous is used as base film.

Plastic films are also used as a heat transfer recording medium.

The heat transfer recording media having a colorant-containing hot-melt ink layer or a heat-reactive color developing reactant layer on base paper or plastic film have been known.

In the heat transfer recording medium having a hot-melt ink layer, for example, a receptor sheet is placed thereon and thermal printing is conducted with a thermal head from the underside of the sheet, with the molten ink being transferred onto the said receptor sheet to form a color image. On the other hand, in the heat transfer recording medium having a heat-reactive color developing reactant layer, a receptor sheet or a sheet having a layer containing a substance reacted with the said color developing reactant when heated to develop color is placed on the said medium and thermal printing is conducted with a thermal head from the underside of the sheet to form a color image on the sheet surface.

In the above uses, it is required for the transfer medium to possess the antinomy properties, viz. transfer layer receptivity and transferability of the received transfer layer. The transfer medium is also required to have antistatic properties because in case where the transfer medium is electrically charged on receiving the transfer layer, the layer may not be received faithfully.

The transfer medium is further required to have anti-stick properties. Since the surface temperature of the thermal head may reach a high temperature of 300 to 400° C. or even higher, the heat transfer recording medium using a plastic film involves the problem of sticking or generation of stick remnants.

In order to avoid such a problem, it has been proposed to provide a stick preventive layer such as mentioned below on the thermal head contacting area of the plastic film. For instance, as such a stick preventive layer, there have been proposed metallic layer, heat-resistant resin layer, benzotriazole layer, ethyl cellulose layer containing sodium stearylsulfonate, and polyester resin layer containing stearic acid.

Nonetheless, any of these anti-stick layers is incapable of producing a sufficient preventive effect, and when the laminations are increased to an extent where the desired stick preventive effect can be expected, there arise such problems as reduction of heat sensitivity due to increase of heat capacity and sticking of the stick preventive layer itself or generation of stick remnants.

SUMMARY OF THE INVENTION

An object of the present invention is to provide a polarizing plate protective film base which has excellent antistatic properties, chemical resistance, scratch resistance and handling quality to enable easy practice of inspection, is effective for preventing deposition of adhesives, dust and such on the liquid crystal display panels, can be easily separated when it is removed as a disused article after serving for the protection of the polarizing plate, and has an effect to inhibit electric charging on its release to prevent damage to the circuits connected to the liquid crystal display panel by such release charging.

Another object of the present invention is to provide a laminated film having excellent antistatic properties, scratch resistance and slip characteristics, hence highly proof against fouling due to collection of dust, etc., also proof against scratching, and improved in handling quality.

Still another object of the present invention is to provide a transfer medium having excellent transfer layer receptivity, transferability of the received transfer layer and antistatic properties, and accordingly capable of forming a highly faithful image on the receptor sheet surface on which an image is to be formed by heat transfer or other means.

Still another object of the present invention is to provide a heat transfer recording medium which can prevent stoppage of run, or so-called sticking or generation of stick remnants, which tends to occur between the thermal head and the heat transfer recording medium or the object to be printed in heat transfer printing, and is capable of making stable and clear printing.

To attain the above aims, in the first aspect of the present invention, there is provided a polarizing plate protective film base comprising a laminated film comprising a biaxially oriented polyester film and a coating layer provided on one side of said biaxially oriented polyester film, the surface resistance of said coating layer being not more than $1 \times 10^{11} \Omega$, the adhesive force (P2) of the coating layer surface with an acrylic adhesive being not more than 3,000 mN/cm, and the difference between adhesive force (P1) of the coating layer surface with a rubber adhesive and adhesive force (P2) with an acrylic adhesive (P1–P2) being not less than 100 mN/cm.

In the second aspect of the present invention, there is provided a laminated film comprising a biaxially oriented polyester film and a coating layer on one side of said biaxially oriented polyester film, the surface resistance of said coating layer being not more than $1 \times 10^{11} \Omega$, the hardness of said coating layer being H or harder in pencil hardness, the thickness of said coating layer being in the range from 0.5 µm to 1/10 of the thickness of the biaxially oriented polyester film, and the coefficient of friction between the coating layer surface and the side of the film opposite from the coating layer being not more than 0.4.

In the third aspect of the present invention, there is provided a transfer medium comprising film comprising a film and a coating layer laminated on at least one side of said film, the surface resistance of said coating layer being not more than $1 \times 10^{11} \Omega$, the angle of contact made by the coating layer surface with a waterdrop being not more than 100°, and the adhesive force of the coating layer surface with an acrylic adhesive being 200 to 3,000 mN/cm.

In the fourth aspect of the present invention, there is provided a heat transfer recording medium comprising a biaxially oriented polyester film and an anti-stick layer provided on one side of said biaxially oriented polyester film, the surface resistance of said anti-stick layer being not more than $1 \times 10^{11} \Omega$, and the coefficient of friction thereof being not more than 0.4, and the contact angle thereof with a water drop being not less than 70°.

DETAILED DESCRIPTION OF THE INVENTION

A detailed description of the present invention follows.

The polarizing plate protective film base in the first aspect of the present invention comprises a laminated film having a coating layer formed on one side of a biaxially oriented polyester film, which, in use, is attached to the surface of a polarizing plate of a liquid crystal display panel by an adhesive or other means. In a preferred mode of practice of the present invention, an adhesive layer is provided on the opposite side of the film and a release film is laminated on the surface of the said adhesive layer. Usually, this polarizing plate protective film support is produced through the successive steps of forming a coating layer, further forming an adhesive layer thereon, and laminating a release film on the said adhesive layer.

The laminated film according to the second aspect of the present invention comprises a biaxially oriented polyester film and a coating layer on one side thereof.

The transfer medium according to the third aspect of the present invention comprises a laminated film comprising a base film and a coating layer formed on one side of the said base film, which can be used as a heat transfer recording medium for heat transfer devices. The base film used in the present invention is not subject to any specific restrictions, but a biaxially oriented polyester film is preferably used.

The heat transfer recording medium according to the fourth aspect of the present invention features the provision of a hot-melt ink layer and a heat-reacting type color-developing reactant and is capable of forming a color image by transferring the molten ink onto a receptor sheet in thermal printing. This recording medium comprises a laminated film obtained by providing an anti-stick layer on one side of a biaxially oriented polyester film. In a preferred mode of practice of the present invention, a release layer is provided on the opposite side of the base film.

In the first to fourth aspects of the present invention, the "biaxially oriented polyester film" (which may hereinafter be referred to simply as the film) is a film obtained by stretching and orienting a sheet melt extruded from an extruder diehead according to the extrusion process.

The polyester comprising the said film is one obtained from polycondensation of an aromatic dicarboxylic acid and an aliphatic glycol. Examples of the aromatic dicarboxylic acids usable here are terephthalic acid and 2,6-naphthalenedicarboxylic acid. As the aliphatic glycol used as another reactant, ethylene glycol, diethylene glycol, 1,4-cyclohexanedimethanol, etc., can be cited as examples. Typical examples of the said polyester are polyethylene terephthalate (PET) and polyethylene-2,6-naphthalene dicarboxylate (PEN).

The said polyester may be a copolymer containing a third component. The dicarboxylic acid moiety of the copolymer polyester may be constituted by, for instance, isophthalic acid, phthalic acid, terephthalic acid, 2,6-naphthalenedicarboxylic acid, adipic acid, sebacic acid, oxy-carboxylic acid (e.g. p-oxybenzoic acid) or the like. The glycol moiety may be constituted by, for instance, ethylene glycol, diethylene glycol, propylene glycol, butanediol, 1,4-cyclohexane dimethanol, neopentyl glycol or the like. Each of these dicarboxylic acid moiety and glycol moiety may be constituted by two or more components.

In certain aspects, the present invention contemplates the incorporation of particles in the film on condition that such particles won't impair film transparency. Incorporation of particulates can improve the handling qualifies of the films. As such particles, there can be used, for instance, the particles of silicon dioxide, calcium carbonate, aluminum oxide, titanium dioxide, kaolin, talc, zeolite, lithium fluoride, barium sulfate, carbon black, and fine powder of heat-resistant polymers such as disclosed in Japanese Patent Publication (KOKOKU) No. 59-5216. Two or more types of these particles may be used together. The average size of these particles is usually 0.02 to 2 µm, preferably 0.05 to 1.5 µm, more preferably 0.05 to 1 µm, and the content of the particles is usually 0.01 to 2% by weight, preferably 0.02 to 1% by weight.

Various methods are available for containing the said particles in the film. For instance, the particles may be added at any desired stage in the polyester producing process. It is especially preferable to add the particles as a slurry thereof in ethylene glycol or the like at the stage of esterification or at the stage before start of polycondensation reaction after the end of the ester exchange reaction and proceed with the polycondensation reaction. It is also possible to use a method in which the slurry formed by dispersing the particles in ethylene glycol or water is blended with polyester materials, or a method in which the dried particles are blended with polyester materials by using a kneader/extruder.

The film can be produced by a method in which the sheet melt extruded from the extruder diehead according to the extrusion process is stretched and oriented in two axial directions, viz. in the machine direction and in the transverse direction.

In the extrusion process, polyester is melt extruded from the diehead of an extruder and cooled and solidified by a cooling roll or drum to obtain a non-stretched sheet. Here, it is necessary to enhance adhesion between the sheet and the rotating cooling drum to improve planarity of the sheet. For this purpose, electrostatic pinning method or liquid coating method is preferably used. "Electrostatic pinning method" is a method in which the linear electrodes are passed in the direction perpendicular to the sheet flow on the upper side of the sheet, and a DC voltage of about 5 to 10 kV is applied to the electrodes to give a static charge to the sheet to thereby strengthen sheet adhesion to the drum. "Liquid coating method" is a method in which a liquid is applied uniformly over the whole or part (for example, only the portions contacted with both ends of the sheet) of the rotary cooling drum surface to boost adhesion of the sheet to the drum. In the present invention, both of the above methods may be used simultaneously as required.

The method of biaxially stretching and orienting the film is free to choose, but usually simultaneous biaxial stretching or successive biaxial stretching is used. For simultaneous biaxial stretching, the above-mentioned non-stretched sheet is stretched and oriented in both machine direction and transverse direction simultaneously in a state of being controlled in temperature at usually 70 to 120° C., preferably at 80 to 110° C., at a stretch ratio of 4 to 50 times, preferably 7 to 35 times, more preferably 10 to 20 times the original surface area. The thus worked sheet is further subjected to a heat treatment at a temperature of usually 170 to 250° C. under tension or under relax of not more than 30% to obtain a stretched and oriented film. In successive biaxial stretching, the said non-stretched sheet is first stretched in one direction by a roll or tenter type stretching machine at a stretching temperature of usually 70 to 120° C., preferably 80 to 110° C. at a stretch ratio of usually 2.5 to 7 times, preferably 3.0 to 6 times the original surface area. This monoaxially stretched sheet is further stretched in the direction vertical to the first-stage stretching direction at a stretching temperature of usually 70 to 120° C., preferably 80 to 115° C. at a stretch ratio of usually 3.0 to 7 times, preferably 3.5 to 6 times the original surface area, and then subjected to a heat treatment under tension or under relax of not more than 30% at 170 to 250° C. to obtain a stretched and oriented film.

For the above stretching, it is possible to use a method in which stretching in one direction is conducted in two or more stages. In this case, stretching is preferably performed so that the final stretch ratios in the two directions will fall within the above-defined ranges. If necessary, the stretched sheet may be re-stretched in the machine and/or transverse directions before or after the heat treatment.

In the polarizing plate protective film support according to the first aspect of the present invention, film thickness is not specifically defined, but it is usually 5 to 150 $\mu$m, preferably 10 to 100 $\mu$m, more preferably 25 to 75 $\mu$m. When film thickness is less than 5 $\mu$m, the surface protective effect of the film for the liquid crystal display panel may be insufficient, and also the handling qualities in the wear-resistant layer forming step or adhesive layer forming step tend to deteriorate. On the other hand, when film thickness exceeds 150 $\mu$m, flexibility and total light transmittance of the film may reduce, which may worsen handling qualities of the film and may also disturb execution of the tests involving optical evaluations, such as display performance, hue, contrast and contamination of the liquid crystal display panel.

In the laminated film according to the second aspect of the present invention, also film thickness is not specific, but it is usually 5 to 150 $\mu$m, preferably 10 to 100 $\mu$m, more preferably 25 to 75 $\mu$m. When film thickness is less than 5 $\mu$m, the film tends to prove weak in nerve, resulting in reduced handling qualities in the coating layer forming step or adhesive layer forming step. When film thickness is over 150 $\mu$m, workability, etc., of the film may deteriorate due to reduced flexibility. In the laminated film in this aspect, the biaxially oriented polyester film may be a coextruded laminate and may be colored.

In the laminated film according to the third aspect of the present invention, also film thickness is not specifically defined, but it is usually 5 to 50 $\mu$m, preferably 5 to 25 $\mu$m. When film thickness is less than 5 $\mu$m, handling qualities of the film in the transfer layer forming step, etc., may be bad. When film thickness exceeds 50 $\mu$m, transferability of the transfer layer may deteriorate.

In the heat transfer recording medium in the fourth aspect of the present invention, also film thickness is not specifically defined, but it is usually 3 to 75 $\mu$m, preferably 5 to 50 $\mu$m, more preferably 5 to 25 $\mu$m. When film thickness is less than 3 $\mu$m, workability or handling qualities of the film in the coating step, etc., may deteriorate, and when film thickness exceeds 75 $\mu$m, it may become difficult to obtain a clear image due to deterioration of transferability.

In the first to fourth aspects of the present invention, the coating layer is formed by coating one side of a biaxially oriented polyester film with a cationic copolymer in a state of being dissolved in a solvent such as water, methyl alcohol, ethyl alcohol or isopropyl alcohol, and drying the coat. The coating operation is not subject to any specific restrictions, but usually it is conducted by using a conventional coating machine such as air knife coater, blade coater, hard coater, gravure coater, curtain coater or roll coater.

Thickness of the coating layer in the first aspect of the present invention is usually in the range of 0.01 to 0.3 $\mu$m, preferably 0.05 to 0.2 $\mu$m. When coating layer thickness is less than 0.01 $\mu$m, adhesive force of the layer to the acrylic adhesive tends to increase, and when coating layer is more than 0.3 $\mu$m, an interference fringe visible with the eye may be formed in the coating layer, obstructing inspections of the polarizing plate and liquid crystal display panel.

Thickness of the coating layer in the second aspect of the present invention is in the range from 0.5 $\mu$m to ¹⁄₁₀ of the thickness of the biaxially oriented polyester film. When coating layer thickness is less than 0.5 $\mu$m, scratch resistance of the film tends to lower, and when coating layer thickness exceeds ¹⁄₁₀ of the thickness of the biaxially oriented polyester film, the laminated film is likely to curl.

Thickness of the coating layer in the third aspect of the present invention is usually in the range of 0.01 to 3 $\mu$m, preferably 0.05 to 2 $\mu$m. If thickness of the coating layer is less than 0.01 μm, the adhesive force to the acrylic adhesives tends to rise, and when the coating build-up exceeds 3 μm, the coated film may curl strongly.

Thickness of the coating layer (anti-stick layer) in the fourth aspect of the present invention is usually in the range of 0.01 to 3 μm, preferably 0.05 to 2 μm. When coating layer thickness is less than 0.01 μm, the stick preventive effect of the layer tends to lower, and when coating build-up exceeds 3 μm, heat sensitivity may lower due to the increase of heat capacity.

In the first to fourth aspects of the present invention, in the above coating operation, it is possible to properly contain where necessary other additives such as monomers, resins, cross-linking agent, pigment, etc., as far as mixing of such additives does not give any adverse effect on the cationic copolymer performance.

The said cationic copolymer comprises principally cationic monomeric units, hydrophobic monomeric units and organopolysiloxane units.

The cationic monomeric units usable in the present invention include those containing quaternary ammonium base in the unit. Notably, use of the monomeric units represented by the following formula (a) can provide better antistatic and antifouling properties to the film.

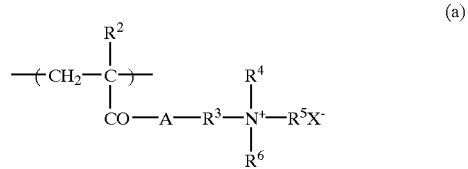

(a)

wherein A represents O or NH; $R^2$ represents hydrogen or $CH_3$; $R^3$ represents a $C_2-C_4$ alkylene group or $-CH_2CH(OH)CH_2-$; $R^4$, $R^5$ and $R^6$ may be identical or different and represent independently a $C_1-C_{10}$ alkyl or aralkyl group; and X represents a halogen or an alkylsulfuric acid ion.

Specifically, the said cationic monomeric units include (meth)acrylic monomeric units such as (meth)acryloyloxytrimethylammonium chloride, (meth)acryloyloxyhydroxypropyltrimethylammonium chloride, (meth)acryloyloxytriethylammonium chloride, (meth)acryloyloxydimethylbenzylammonium chloride, (meth)acryloyloxytrimethylammonium chloride, and (meth) acryloyloxytrimethylammonium methylsulfate; and (meth)acrylamide-based cationic monomeric units such as (meth)acrylamidopropyltrimethylammonium chloride, (meth)acrylamidopropyltrimethylammonium chloride, and (meth)acrylamidopropyldimethylbenzylammonium chloride. In application of these cationic monomeric units, the corresponding monomers may be directly polymerized, or their precursors, viz. monomers having tertiary amino groups, for example, dimethylaminoethyl (meth)acrylate or dimethylaminopropyl acrylamide, may be first polymerized and then cationized with a modifier such as methyl chloride.

It is satisfactory for the cationic monomeric units to take usually 15 to 60% by weight of the whole copolymer. If their ratio is less than 15% by weight, the film tends to become defective in antistatic properties, and if the ratio is in excess of 60% by weight, the film tends to become liable to blocking.

As the hydrophobic monomeric units in the present invention, there may be used various hydrophobic monomeric units. Examples of such hydrophobic monomeric units include alkyl (meth)acrylates such as methyl (meth)acrylate, ethyl (meth)acrylate, butyl (meth)acrylate, isobutyl (meth)acrylate, tertiary butyl (meth)acrylate, cyclohexyl (meth)acrylate, dodecyl acrylate, and stearyl (meth)acrylate, styrenes, and vinyl esters such as vinyl acetate. The hydrophobic monomeric units account for 30 to 84.9% by weight of the whole copolymer. If their ratio is less than 30% by weight, anti-fouling effect is unsatisfactory, and if the ratio exceeds 84.9% by weight, antistatic performance lowers relatively.

The organopolysiloxane units usable in the present invention include those represented by the following formula (b):

(b)

wherein $R^1$'s may be identical or different and represent independently a $C_1-C_{10}$ alkyl or phenyl group, and n is an integer of 5 or more.

If n is less than 5, the obtained copolymer may not be provided with sufficient lubricity. The ratio of organopolysiloxane units in the cationic copolymer is usually 0.1 to 20% by weight. If their ratio is less than 0.1% by weight, anti-fouling effect tends to become unsatisfactory. On the other hand, no further improvement of anti-fouling effect can be expected even if the ratio of organopolysiloxane units is increased over 20% by weight.

The organopolysiloxane units are preferably incorporated in the cationic copolymer by using a precursor represented by the following formula (l), (m) or (n). The precursors represented by the following formulae can be incorporated in the copolymer by using a reactive group D.

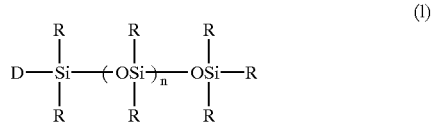

(l)

wherein D represents a radical polymerizable group selected from the group consisting of vinyl groups, acryloyloxyalkyl groups and methacryloyloxyalkyl groups, an epoxy group such as glycidoxyalkyl group, or an aminoalkyl group; R represents a $C_1-C_{10}$ alkyl or phenyl group; and n is an integer of 5 or more.

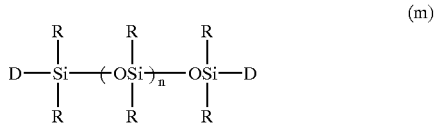

(m)

wherein D represents a radical polymerizable group selected from the group consisting of vinyl groups, acryloyloxyalkyl groups and methacryloyloxyalkyl groups, an epoxy group such as glycidoxypropyl group, or an aminoalkyl group; R represents a $C_1-C_{10}$ alkyl group or a phenyl group; and n is an integer of 5 or more.

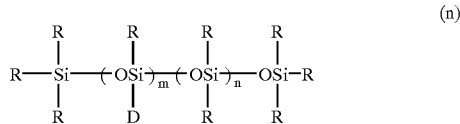

wherein D represents an epoxy group such as glycidoxypropyl, an aminoalkyl group or a mercaptoalkyl group; R represents a $C_1$–$C_{10}$ alkyl group or a phenyl group; m is an integer of 1 to 20; and n is an integer of 5 or more.

As the precursor, it is possible to use those commercially sold as reactive silicone, but in view of the fact that reactivity lowers with increase of molecular weight, n is preferably not more than 200 in the case of formula (l) or (m), and not more than 400 even in the case of formula (n) with many reactive groups.

Incorporation of the precursor as a cationic copolymer component can be effected by polymerizing it simultaneously with other monomers in case where the reactive group D is a polymerizable group. In case where D is a mercaptoalkyl group, the precursor can be introduced efficiently through chain transfer by polymerizing a cationic monomer (a) and a hydrophobic monomer (b) in the presence of this precursor.

In case where D is an epoxy group, a cationic monomer (a) and a hydrophobic monomer (b) are copolymerized together with other monomer, for example, a hydrochloride of a carboxy group-containing monomer such as (meth) acrylic acid reactive with the epoxy group or a tertiary amine group-containing monomer such as dimethylaminoethyl (meth)acrylate, and then reacted with the epoxy group of the precursor.

Likewise, in case where D is an aminoalkyl group, a cationic monomer (a) and a hydrophobic monomer (b) are copolymerized together with a monomer reactive with the amino group such as glycidyl (meth)acrylate, and then reacted with the amino group of the precursor. If necessary, other hydrophilic monomer(s) such as hydroxylethyl (meth) acrylate and vinylpyrrolidone may be contained as a copolymer component provided that such monomers give no influence on antistatic and anti-fouling properties of the film.

As means of polymerization, it is possible to use the known radical polymerization methods such as bulk polymerization, solution polymerization and emulsion polymerization. Preferred is solution polymerization in which the respective monomers are dissolved in a solvent, and after adding a polymerization initiator, the mixture is stirred under heating in a stream of nitrogen. As solvent, water or an alcohol such as methyl alcohol, ethyl alcohol or isopropyl alcohol is preferred. It is also possible to use a mixture of these solvents. As polymerization initiator, a peroxide such as benzoyl peroxide or lauroyl peroxide or an azo compound such as azobisbutyronitrile or azobisvaleronitrile is preferably used. Monomer concentration is usually 10 to 60% by weight, while polymerization initiator is used in an amount of usually 0.1 to 10% by weight based on the monomers.

Molecular weight of the cationic copolymer may be arbitrarily determined by taking into account polymerization conditions such as polymerization temperature, type and amount of polymerization initiator, amount of solvent and chain transfer, type of organopolysiloxane precursor, content of reactive groups and other factors, but usually molecular weight of the obtained cationic copolymer preferably falls within the range of 5,000 to 500,000. The coating layer formed on the biaxially oriented polyester film by using a coating material prepared in the manner described above has improved antistatic properties and antifouling resistance.

As other cationic copolymers usable in the present invention, there can be cited polymers having organopolysiloxane units and quaternary ammonium salt units, and those mainly comprising an activation energy ray-curing resin containing a polyfunctional acrylate having three or more acryloyl groups in the molecule.

The polymers having organopolysiloxane units and quaternary ammonium salt units may be ones having (meth) acryloyl groups in the side chain if such is necessary. These polymers having organopolysiloxane units and quaternary ammonium salt units can be obtained by converting a tertiary amine polymer compound—which has been obtained by polymerizing an organopolysiloxane compound having one radical polymerizable group in the molecule or two mercapto groups in the molecule and a tertiary amine compound having one radical polymerizable group in the molecule—to a quaternary ammonium salt with a quaternarizing agent. When copolymerizing an organopolysiloxane compound and a tertiary amine compound having one radical polymerizable group in the molecule, it is possible to further copolymerize therewith other (meth)acrylic esters. Also, the said polymer having organopolysiloxane units and quaternary ammonium salt units can be obtained by polymerizing an organopolysiloxane compound having one radical polymerizable group in the molecule or two mercapto groups in the molecule and a quaternary ammonium salt having one radical polymerizable group in the molecule. When copolymerizing an organopolysiloxane compound and a quaternary ammonium salt having one radical polymerizable group in the molecule, it is possible to copolymerize therewith other (meth)acrylic esters.

The organopolysiloxane compounds having one radical polymerizable group in the molecule are not subject to any specific restrictions as far as they have one radical polymerizable group such as acryl, methacryl, styryl, cinnamic ester, vinyl or allyl in the molecule, but in view of facilitation of copolymerization of an organopolysiloxane compound having one radical polymerizable group in the molecule and a tertiary amine compound or a quaternary ammonium salt having a radical polymerizable group, the organopolysiloxane compound is preferably one having a radical polymerizable group selected from acryl, methacryl and styryl.

It is also preferable to use an organopolysiloxane compound having two mercapto groups in the molecule, which is introduced into the polymer through sulfide linkage by chain transfer when a tertiary amine compound having a radical polymerizable group or a quaternary ammonium salt having a radical polymerizable group is polymerized. The organopolysiloxane units contained in this organopolysiloxane compound are represented by the following formula (c):

wherein $R^1$ and $R^2$ may be identical or different and represent independently a methyl group or a phenyl group; and n is an integer of 5 or more.

Number-average molecular weight of the organopolysiloxane compounds having one radical polymerizable group in the molecule is usually 400 to 60,000, preferably 1,000 to 30,000. The tertiary amine compounds having one radical polymerizable group in the molecule are represented by the following formula (d):

(d)

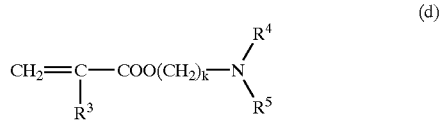

wherein $R^3$ represents H or $CH_3$; $R^4$ and $R^5$ represent independently H or a $C_1$–$C_9$ alkyl group which may have a substituent; and k is an integer of 1 to 6.

Examples of such tertiary amine compounds include N,N-dimethylaminoethyl (meth)acrylate, N,N-diethylaminoethyl (meth)acrylate, N,N-dimethylaminopropyl methacrylate, N,N-dimethylaminobutyl methacrylate, N,N-dihydroxyethylaminoethyl methacrylate, N,N-dipropylaminoethyl methacrylate, and N,N-dibutylaminoethyl methacrylate.

The quaternary ammonium salts having one radical polymerizable group in the molecule include those obtained by quaternarizing the tertiary amine compounds of the formula (d) with a quaternarizing agent, for example, alkyl chlorides such as methyl chloride and butyl chloride, halides such as methyl bromide, methylbenzyl chloride and benzyl chloride, alkylsulfuric acids such as dimethylsulfuric acid, diethylsulfuric acid and dipropylsulfuric acid, and sulfonic esters such as methyl p-toluenesulfonate and methyl benzenesulfonate.

When copolymerizing an organopolysiloxane compound having one radical polymerizable group in the molecule or two mercapto groups in the molecule and a tertiary amine compound or quaternary ammonium salt having one radical polymerizable group in the molecule, it is possible to use (meth)acrylic esters in addition to the above monomers. Exemplary of such (meth)acrylic esters are methyl (meth) acrylate, ethyl (meth)acrylate, n-butyl (meth)acrylate, isobutyl (meth)acrylate, 2-ethylhexyl (meth)acrylate, benzyl (meth)acrylate, cyclohexyl (meth)acrylate, isobornyl (meth) acrylate, dicyclopentenyl (meth)acrylate, dicyclopentenyloxyethyl (meth)acrylate, ethoxyethyl (meth)acrylate, ethylcarbitol (meth)acrylate, butoxyethyl (meth)acrylate, cyanoethyl (meth)acrylate, glycidyl (meth)acrylate, 2-hydroxyethyl (meth)acrylate, and 2-hydroxypropyl (meth) acrylate, all of which have one radical polymerizable group in the molecule.

In the copolymerization of an organopolysiloxane compound having one radical polymerizable group or two mercapto groups in the molecule and a tertiary amine compound or quaternary ammonium salt having one radical polymerizable group in the molecule, the said organopolysiloxane compound is used in an amount of usually 1 to 40% by weight, preferably 5 to 30% by weight in 100% by weight of the whole copolymerizable monomers. When the amount of the said compound used is less than 1% by weight, it may not be possible to let the vinyl polymer bleed out to the coating layer surface, hence the coating layer may not be provided with desired antistatic properties. When the amount of the compound exceeds 40% by weight, sufficient antistatic properties may not be obtained because of the reduced rate of the tertiary amine compound or quaternary ammonium salt having one radical polymerizable group in the molecule.

The other reactant, viz. a tertiary amine compound or quaternary ammonium salt having one radical polymerizable group in the molecule, is used in an amount of usually 60 to 99% by weight, preferably 60 to 95% by weight, in 100% by weight of the copolymerizable monomers. When its amount is less than 60% by weight, satisfactory antistatic properties may not be provided to the coating layer, and when the reactant amount exceeds 99% by weight, no satisfactory antistatic properties may be afforded to the coating layer because of the too low rate of the organopolysiloxane compound.

Copolymerization of the said monomers, viz. an organopolysiloxane compound, a tertiary amine compound having a radical polymerizable group, a (meth)acrylic ester and a quaternary ammonium salt having a radical polymerizable group, is carried out in a solvent using an ordinary radical polymerization initiator. As solvent, there can be used alcohols such as methyl alcohol, ethyl alcohol, n-propyl alcohol, iso-propyl alcohol and n-butyl alcohol; ketones such as acetone, methyl ethyl ketone, methyl isobutyl ketone and cyclohexanone; esters such as ethyl acetate, propyl acetate and butyl acetate; aromatic hydrocarbons such as toluene and xylene; ethers such as 2-methoxyethanol, 2-ethoxyethanol, 2-butoxyethanol, ethylene glycol dimethyl ether, ethylene glycol diethyl ether and diethylene glycol dimethyl ether; esters such as 2-methoxyethyl acetate, 2-ethoxyethyl acetate and 2-butoxyethyl acetate; water; and mixtures thereof.

As radical polymerization initiator, organic peroxides such as benzoyl peroxide, di-t-butyl peroxide and cumene hydroperoxide, and azo compounds such as 2,2'-azobisisobutyronitrile, 2,2'-azobis(2,4-dimethylvaleronitrile) and 2,2'-azobis(4-methoxy-2,4-dimethylvaleronitrile) are preferably used. The monomer concentration in the polymerization solution is usually 10 to 60% by weight, and the polymerization initiator is used in an amount of usually 0.1 to 10% by weight, preferably 0.3 to 5% by weight, based on the monomeric mixture.

After copolymerizing an organopolysiloxane compound, a tertiary amine compound having one radical polymerizable group in the molecule and optionally a (meth)acrylic ester, the produced tertiary amine polymer is converted to a quaternary ammonium salt with a quaternarizing agent. As quaternarizing agent, it is possible to use, for example, alkyl chloride such as methyl chloride and butyl chloride, halides such as alkyl chloride, methyl bromide, methylbenzyl chloride and benzyl chloride, alkylsulfuric acids such as dimethylsulfuric acid, diethylsulfuric acid and dipropylsulfuric acid, and sulfonic esters such as methyl p-toluenesulfonate and methyl benzenesulfonate.

Among the polymers having organopolysiloxane units and quaternary ammonium salt units produced in the manner described above, especially the one obtained by converting a tertiary amine polymer compound—which has been obtained by polymerizing an organopolysiloxane compound having one radical polymerizable group or two mercapto groups in the molecule, a tertiary amine compound having one radical polymerizable group in the molecule and optionally a (meth)acrylic ester—to a quaternary ammonium salt with an alkyl chloride is preferred as such a polymer has good compatibility with polyfunctional acrylates having three or more acryloyl groups in the molecule and is capable of providing a coating layer with good transparency.

When a polymer having organopolysiloxane units with (meth)acryloyl groups in the side chain and quaternary ammonium salt units is used as the said polymer having organopolysiloxane units and quaternary ammonium salt units, it is possible to improve durability of antistatic performance as linkage is formed between the said polymer and polyfunctional acrylate during activation energy ray irradiation.

A polymer having (meth)acryloyl group in the side chain of the polymer having organopolysiloxane units and quaternary ammonium salt units can be obtained by copolymerizing glycidyl (meth)acrylate together with an organopolysiloxane compound and a tertiary amine compound or quaternary ammonium salt having one radical polymerizable group in the molecule, and then adding a (meth)acrylic acid (in case of using a tertiary amine compound, converting the obtained tertiary amine polymer compound to a quaternary ammonium salt with a quaternarizing agent).

Such a polymer can be also obtained by copolymerizing a (meth)acrylate having hydroxyl groups such as hydroxyethyl (meth)acrylate, hydroxypropyl (meth)acrylate, pentaerithritol triacrylate, or dipentaerithritol acrylate in addition to the said monomers (an organopolysiloxane compound and a tertiary amine compound or quaternary ammonium salt having one radical polymerizable group in the molecule), and then adding a 1:1 (by mole) adduct of a (meth)acrylate having hydroxyl groups such as hydroxyethyl (meth)acrylate or hydroxypropyl (meth)acrylate and an isocyanate compound such as tolylene diisocyanate, isophorone diisocyanate or hexamethylene diisocyanate (in case of using a tertiary amine compound, converting the obtained tertiary amine polymer compound to a quaternary ammonium salt with a quaternarizing agent).

Among the polymers having organopolysiloxane units and quaternary ammonium salt units with (meth)acryloyl groups in the side chain obtained in the manner described above, those obtained by copolymerizing an organopolysiloxane compound having one radical polymerizable group or two mercapto groups in the molecule, a tertiary amine compound having one radical polymerizable group in the molecule and a (meth)acrylic ester having a functional group, then adding a compound having a (meth)acryloyl group to the produced polymer, and converting the tertiary amine compound to a quaternary ammonium salt with alkyl chloride are especially preferred as they have good compatibility with polyfunctional acrylates having three or more acryloyl groups in the molecule and are capable of forming a coating layer with high transparency.

Examples of the polyfunctional acrylates having three or more acryloyl groups in the molecules are trimethylolpropane triacrylate, ethylene oxide-modified trimethylolpropane triacrylate, propylene oxide-modified trimethylolpropane triacrylate, tris(acryloxyethyl) isocyanurate, caprolactone-modified tris(acryloxyethyl) isocyanurate, pentaerithritol triacrylate, pentaerithritol tetraacrylate, dipentaerithritol tetraacrylate, dipentaderithritol pentaacrylate, dipentaerithritol hexaacrylate, alkyl-modified dipentaerithritol triacrylate, alkyl-modified dipentaerithritol tetraacrylate, alkyl-modified dipentaerithritol pentaacrylate, caprolactone-modified dipentaerithritol hexaacrylatle, carboxy group-containing polyfunctional acrylates obtained by reacting tetracarboxylic dianhydrides and hydroxyl group-containing polyfunctional acrylates having a hydroxyl group and three or more acryloyl groups in the molecule, and mixtures thereof.

Examples of the tetracarboxylic dianhydrides include pyromellitic dianhydride, 3,3',4,4'-benzophenonetetracarboxylic dianhydride, 4,4'-biphthalic anhydride, 4,4'-oxodiphthalic anhydride, 4,4'-(hexafluoroisopropylidene)diphthalic anhydride, 1,2,3,4-cyclopentatetracarboxylic dianhydride, 5-(2,5-dioxotetrahydrofur)-3-methyl-3-cyclohexene-1,2-dicarboxylic anhydride, 4-(2,5-dioxotetrahydrofuran-3-yl)-tetralin-1,2-dicarboxylic anhydride, 3,4,9,10-perillenetetracarboxylic dianhydride, and bicyclo[2,2,2]octho-7-en-2,3,5,6-tetracarboxylic dianhydride.

Examples of the hydroxyl group-containing polyfunctional acrylates having a hydroxyl group and three or more acryloyl groups in the molecule are pentaerithritol triacrylate, dipentaerithritol tetraacrylate, dipentaerithritol pentaacrylate, and mixtures thereof. Among these polyfunctional acrylates having three or more acryloyl groups in the molecule, dipentaerithritol hexaacrylate, dipentaerithritol pentaacrylate, carboxy group-containing polyfunctional acrylates obtained by reacting tetracarboxylic dianhydrides and hydroxyl group-containing polyfunctional acrylates having a hydroxyl group and three or more acryloyl groups in the molecule, and mixtures thereof are especially preferred as they are capable of forming a coating layer with excellent wear resistance.

Beside the polymers having organopolysiloxane units and quaternary ammonium salt units and the polyfunctional acrylates having three or more acryloyl groups in the molecule, there can also be used other polymeric monomers, for example, acrylates having one or two acryloyl groups in the molecule. More specifically, urethane acrylates or epoxy acrylates having two acryloyl groups can be used within limits not affecting wear resistance and antistatic properties of the coating layer (such as not more than 20% by weight in the coating layer composition).

In case of using ultraviolet rays as activation energy rays for curing of the coating composition, a photopolymerization initiator is used in addition to the said polymer having organopolysiloxane units and quaternary ammonium salt units and the said polyfunctional acrylate having three or more acryloyl groups in the molecule.

As photopolymerization initiator, 2,2'-ethoxyacetophenone, 1-hydroxycyclohexyl phenyl ketone, dibenzoyl, benzoin, benzoin methyl ether, benzoin ethyl ether, benzoin isopropyl ether, p-chlorobenzophenone, p-methoxybenzophenone, Michler's ketone, acetophenone, 2-chlorothioxanetone, anthraquinone, phenyl disulfide, 2-methyl-[4-(methylthio)phenyl]-2-morphorinopropane-1-one, 2-hydroxy-2-methyl-1-phenyl-propane-1-one, and 2,4,6-trimethylbenzoyl-diphenyl-phosphine oxide can be cited as examples. These photopolymerization initiators may be used either singly or as a combination of two or more.

As photopolymerization initiator assistant, tertiary amines such as triethylamine, triethanolamine and 2-dimethylaminoethanol, alkylphosfines such as triphenylphosfine, thioethers such as β-thioglycol, and the like can be used.

As modifier, coating properties improver, defoaming agent, thickener, inorganic particles, organic particles, lubricant, organic polymeric materials, dye, pigment, stabilizer and the like can be mentioned. These modifiers are used within limits not impairing the reaction by activation energy rays and are capable of modifying the properties of the activation energy ray-curing resin layer according to the purpose of use of the film. In the composition of the activation energy ray-curing resin layer, the solvent used in the preparation of the copolymer may be blended for such purposes as adjustment of viscosity, improvement of coating workability and control of coating thickness.

Also, in the activation energy ray-curing coating composition of the present invention, various additives such as ultraviolet absorber (benzotriazole-based, benzophenone-based, salicylic acid-based, cyanoacrylate-based, etc.), ultraviolet stabilizer (hindered amine type, etc.), antioxidant (phenol-based, sulfur-based, phosphorus-based, etc.), anti-blocking agent, slip agent, leveling agent, etc., can be blended for the purpose of improving the coating layer properties.

In the present invention, the content of the polymer having organopolysiloxane units and quaternary ammonium salt units in the activation energy ray-curing coating composition is usually 1 to 40% by weight, preferably 5 to 25% by weight, in 100% by weight of the solids. If the polymer content is less than 1% by weight, a coating layer having desired antistatic properties may not be obtained. If the polymer content exceeds 40% by weight, wear resistance of the coating layer tends to lower.

In the present invention, the content of the polyfunctional acrylate having three or more acryloyl groups in the activation energy ray-curing coating composition is usually 60 to 99% by weight, preferably 75 to 95% by weight, in 100% by weight of the solids. If the acrylate content is less than 60% by weight, a coating layer with satisfactory wear resistance may not be obtained, and if the acrylate content exceeds 99% by weight, there may not be obtained a coating layer having desired antistatic properties.

In the present invention, the solids concentration of the activation energy ray-curing coating composition is not specific, but it is usually adjusted to 0.5 to 20% by weight, preferably 1 to 10% by weight, more preferably 1 to 5% by weight.

The content of the photopolymerization initiator in the activation energy ray-curing coating composition is usually 0.5 to 30% by weight, preferably 1 to 20% by weight, in 100% by weight of the solids.

In the present invention, the coating layer is formed by applying and curing a coating composition on one side of the base film. Known coating methods such as reverse coating, gravure coating, rod coating, air knife coating, etc., can be used. Curing of the applied coating composition is effected by irradiation with activation energy rays such as ultraviolet rays, visible rays, electron rays, X-rays, α-rays, β-rays and γ-rays, or by application of heat. As heat source, ultrared heater, heating oven or such can be used. Irradiation with activation energy rays is usually conducted via the coating layer, but it may be performed from the opposite side for enhancing adhesion to the film. If necessary, a reflector capable of reflecting the activation energy rays may be utilized. The coat cured by the activation energy rays shows particularly high scratch resistance and anti-stick quality.

In the film base according to the first aspect of the present invention, it is essential that surface resistance of the coating layer is not more than $1 \times 10^{11} \Omega$. If surface resistance of the coating layer is more than the above value, the layer tends to produce a static charge to promote adhesion of dust. Surface resistance of the coating layer is preferably not more than $5 \times 10^{10} \Omega$, more preferably not more than $1 \times 10^{10} \Omega$.

In the film support in the first aspect of the present invention, adhesive force (P2) of the coating layer surface with an acrylic adhesive needs to be not more than 3,000 mN/cm, preferably not more than 2,750 mN/cm, more preferably not more than 2,500 mN/cm, for the following reason. The LCD polarizing plate protective film base of the present invention is kept in storage in a stacked-up state. During this storage, there may occur a situation where when the film base is cut to a desired size, the adhesive layer may be accidentally squeezed out from between the polyester film and the release film to come into contact with the coating layer of the other protective film. Such contact of the adhesive layer with the coating layer may cause contamination of the coating layer by the adhesive when the adhesive force exceeds 3,000 mN/cm.

In the first aspect of the present invention, the difference between the adhesive force (P1) of the coated side of the film support with a rubber adhesive and the adhesive force (P2) with an acrylic adhesive (P1–P2) is not less than 100 mN/cm, preferably not less than 200 mN/cm. If this difference is less than 100 mN/cm, there may be difficulties in separating the protective film when the protective film is to be separated with a rubber adhesive tape in the final step.

In the second aspect of the present invention, the coating layer needs to have a pencil hardness of H or harder. If the pencil hardness of the coating layer is below (softer) H, the layer surface may be liable to scratch. In this case, when for instance the film base is attached to a window of an automobile or a building, it scratches easily and tends to become cloudy when its surface is wiped with cloth or such for cleaning. The upper limit of pencil hardness of the coating layer of the present invention is supposed to be around 3H for its structural reason.

In the second aspect of the present invention, surface resistance of the coating layer needs to be not more than $1 \times 10^{11} \Omega$. If surface resistance of the coating layer is more than $1 \times 10^{11} \Omega$, the coating layer is likely to produce a static charge to encourage adhesion of dust. The coating layer surface resistance is preferably $1 \times 10^{8}$ to $5 \times 10^{10} \Omega$.

In the second aspect of the present invention, coefficient of friction of the surface provided with the coating layer is not more than 0.4, preferably not more than 0.35, more preferably not more than 0.3. If the value of coefficient of friction exceeds 0.4, handling qualities may deteriorate.

In the first and second aspects of the present invention, a preferred mode of practice consists in a laminated film of a structure in which a coating layer is provided on one side of a biaxially oriented polyester film while an adhesive layer and its protective release film are provided on the other side of the film.

The said adhesive layer is formed with a known adhesive, for example, acrylic adhesive, rubber adhesive, block copolymer adhesive, polyisobutylene adhesive, silicone adhesive, or such. Usually, the adhesive is incorporated in a composition of elastomer, tackifier, softening agent (plasticizer), deterioration inhibitor, filler, crosslinking agent or such.

As elastomer, there can be used, for example, natural rubber, synthetic isoprene rubber, regenerated rubber, SBR, block copolymers, polyisobutylene, butyl rubber, polyacrylic ester copolymer, silicone rubber and the like according to the type of the adhesive used.

As tackifier, rosin, hydrogenated rosin esters, terpene resins, aromatic modified terpene resins, hydrogenated terpene resins, terpene phenol resins, aliphatic petroleum resins, aromatic petroleum resins, alicyclic hydrogenated petroleum resins, cumarone-indene resins, styrene resins, alkyl phenol resins, xylene resins and the like can be used.

As softening agent, paraffinic process oil, naphthenic process oil, aromatic process oil, liquid polybutene, liquid polyisobutylene, liquid polyisoprene, dioctyl phthalate, dibutyl phthalate, castor oil, tall oil and the like can be used.

As deterioration inhibitor, aromatic amine derivatives, phenol derivatives, organic thio acid salts and the like can be used.

As filler, zinc white, titanium white, calcium carbonate, clay, pigment, carbon black and the like are usable. When a filler is used, its amount should be within limits not greatly affecting total light transmittance of the protective film.

As crosslinking agent, sulfur and curing assistant and/or curing accelerator (typically dibutyl carbamate zinc) are used for crosslinking of natural rubber adhesives. As crosslinking agent capable of crosslinking the adhesives comprising natural rubber and carboxylic acid copolymer polyisoprene at room temperature, polyisocyanates are used. As crosslinking agent of butyl rubber and natural rubber typified by high heat resistance and anti-fouling properties, polyalkylphenol resins are used. Organic peroxides such as benzoyl peroxide and dicumyl peroxide can be used for crosslinking of the adhesives using butadiene rubber, styrene-butadiene rubber and natural rubber as base material. These organic peroxides provide non-staining adhesives. As crosslinking assistant, polyfunctional methacrylic esters can be used. There are also adhesives formed by such types of crosslinking as ultraviolet crosslinkage and electron ray crosslinkage.

No specific methods are designated for forming the adhesive layer; it can be formed by applying an adhesive on the other side of the film in the same way as used for forming a wear-resistant layer. Adhesive layer thickness is usually 0.5 to 100 μm, preferably 1 to 50 μm.

In the first aspect of the present invention, adhesive force of the adhesive layer is preferably adjusted to such a degree that the adhesive layer can be separated along with the biaxially oriented polyester film from the polarizing plate surface when an adhesive tape attached to the coating layer is pulled up. In this case, adhesive force between the polarizing plate and the adhesive layer is preferably set to fall in the range of 10 to 400 mN/cm. On the surface of the adhesive layer is laminated a known type of release film for facilitation of handling. The polarizing plate referred to herein is of a structure in which a protective film such as a triacetate cellulose film is laminated on either side of a polarizing film which has been monoaxially oriented by containing iodine, a dichromic dye or such in polyvinyl alcohol.

Total light transmittance (TL) of the polarizing plate protective film base having the above structure according to the first and second aspects of the present invention is not specifically defined, but it is usually not less than 80%, preferably not less than 85%. By use of this protective film base, the tests involving optical evaluations such as display capability, hue, contrast and contamination of the liquid crystal display panels can be conducted with the protective film kept attached on the surface of the polarizing plate.

In the third aspect of the present invention, it is essential that surface resistance of the coating layer is not more than $1 \times 10^{10} \Omega$. If surface resistance of the coating layer exceeds the above value, the film surface tends to produce a static charge, which jeopardizes clear reception of the transfer layer. Surface resistance of the coating layer is preferably not more than $5 \times 10^{10} \Omega$, more preferably less than $1 \times 10^{10} \Omega$.

In the third aspect of the present invention, the angle of contact made by the coated side of the film with a waterdrop is not more than 100°, preferably 70 to 90°. If the value of this contact angle exceeds 100°, transfer layer receptivity may deteriorate. In view of characteristics of the coating layer, the lower limit value of this contact angle is supposed to be around 60°.

In the third aspect of the present invention, adhesive force of the coated side of the film with an acrylic adhesive is 200 to 3,000 mN/cm, preferably 700 to 2,700 mN/cm, more preferably 1,500 to 2,500 mN/cm. When adhesive force is less than 200 mN/cm, there may arise the problems in use, such as deteriorated transfer layer receptivity and easy peeling of the received transfer layer. When adhesive force exceeds 3,000 mN/cm, transferability of the received transfer layer may deteriorate.

In the fourth aspect of the present invention, surface resistance of the coating layer needs to be not more than $1 \times 10^{10} \Omega$. When surface resistance of the coating layer exceeds the above value, the film tends to produce a static charge on its surface and becomes liable to stick to the object to be printed, disenabling clear printing. Surface resistance of the coating layer is preferably not more than $5 \times 10^{10} \Omega$, preferably not more than $1 \times 10^{10} \Omega$.

In the fourth aspect of the present invention, coefficient of friction of the anti-stick layer surface is not more than 0.4, preferably not more than 0.35, more preferably not more than 0.3. If it exceeds 0.4, sliding relation with the thermal head may deteriorate to cause sticking.

In the fourth aspect of the present invention, the angle of contact of the anti-stick layer surface with a waterdrop is not less than 70°, preferably 70 to 100°, more preferably 75 to 95°. If it is less than 70°, sticking tends to occur.

In the fourth aspect of the present invention, a preferred mode of practice comprises a heat transfer recording medium of a structure in which a release layer is provided on one side of a biaxially oriented polyester film having a coating layer on the other side. On the said release layer on one side of the film is provided a transfer sheet used for heat transfer. The said release layer is not specifically defined; it may be of any type as far as it is capable of receiving the transfer sheet and transferring the record to the receiver in the heat transfer operation.

The heat transfer recording medium of the above-described structure according to the fourth aspect of the present invention is capable of preventing incidental stoppage of movement, or so-called sticking, and generation of stick remnants observed between the thermal head and the heat transfer recording medium and/or the object to be printed in thermal transfer printing, and enables stabilized clear printing.

According to the first aspect of the present invention, there is provided a polarizing plate protective film base which has excellent antistatic properties, chemical resistance, scratch resistance and handling qualities, hence enables easy practice of the tests and inspections, and is also useful for preventing deposition of the adhesive, dust and other alien matter on the liquid crystal display panels. Further, it can be easily separated when it is removed as a disused article after serving for the protection of the polarizing plate, and has an effect of suppressing electric charging on separation to prevent damage to the circuits connected to the liquid crystal display panel due to such charging.

According to the second aspect of the present invention, there is provided a laminated film which excels in antistatic properties, scratch resistance, sliding characteristics, etc., and consequently shows excellent performance in prevention of fouling due to collection of dust, etc., prevention of scratches, and handling.

According to the third aspect of the present invention, there is provided a transfer medium improved in transfer layer receptivity, received transfer layer transferability and antistatic properties, hence capable of forming a highly faithful image on the receptor sheet on which an image is to be formed by thermal transfer or other means.

According to the fourth aspect of the present invention, there is provided a thermal transfer recording medium which is capable of preventing accidental stoppage of movement, or so-called sticking, and generation of stick remnants observed between the thermal head and the thermal transfer recording medium and/or the object to be printed in thermal transfer printing, and enables stabilized clear printing.

EXAMPLES

The present invention is described in further detail by showing the examples thereof, but it is to be understood that the present invention is not limited to these examples but can be embodied in other forms as well without departing from the spirit and scope of the present invention. In the following Examples and Comparative Examples, all "parts" are by weight unless otherwise noted. The determination methods and evaluation standards used in the present invention are as described below.

(1) Surface Resistance (Ω) of Coating Layer:

Using "Hiresta-UP MCP-HT450" (Dia Instruments Co., Ltd) the test piece was placed in an atmosphere of 23° C. and 50% RH, then a voltage of 500 V was applied thereto, and surface resistance (Ω) after one-minute charging (voltage application time: one minute) was measured. The electrode type used here was a concentric disc electrode with the main electrode outer diameter of 16 mm and the opposite electrode inner diameter of 40 mm.

(2) Peel Strength (P2) of Coating Layer with Acrylic Adhesive:

A double-sided adhesive tape ("No. 502" mfd. by Nitto Denko KK) was stuck on the coating layer and pressed by a rubber roller under a linear pressure of 450 g/cm, and the laminate was cut into a 50 mm width test piece for measuring peel strength. After allowing the test piece to stand for one hour after pressed attachment, the tape was peeled off by pulling it up in the direction of 180° at a pulling speed of 300 mm/min using an Instron tension tester, and the average value of peel stress was taken as peel strength of the test piece. This test was repeated 10 times, and the arithmetic mean of the 10 measurements was shown as peel strength. Each test was conducted in a standard atmosphere of 23° C. and 50% RH.

(3) Peel Strength (P1) of Coating Layer with Rubber Adhesive:

Nichiban Cellotape was stuck on the coating layer and pressed by a rubber roller under a linear pressure of 450 g/cm to make a test piece for measuring peel strength. After allowing the test piece to stand for one hour after pressing, the tape was peeled off by pulling it up in the direction of 180° at a pulling speed of 300 mm/min using an Instron tension tester, and the mean value of peel stress was taken as peel strength of this test piece. This test was repeated 10 times, and the arithmetic mean of the 10 measurements was shown as peel strength. Each test was conducted in a standard atmosphere of 23° C. and 50% RH.

(4) Total Light Transmittance:

Total light transmittance of the laminated film comprising a biaxially oriented polyester film having a coating layer on one side thereof was measured by an integral spherical turbid meter NDH-300A mfd. by Nippon Denshoku Kogyo KK.

(5) Adhesion of Dust:

Cigarette ash was dropped onto the surface of the coating layer, and the condition of adhesion of ash after one full rotation (360-degree rotation) was observed to evaluate adhesion of dust.

(6) Adherability of Adhesive:

An acrylic adhesive was rubbed against the coating layer surface, and its adhesion when it was tried to rub off the adhesive with fingers was checked.

(7) Coating Layer Thickness:

A small piece of coated film was formed with an epoxy resin by stationary molding and then cut by a microtome, and a section of this coated film was observed under a transmission electron microscope. In this section, the coated layer can be observed substantially parallel to the film surface by light and shade. The distance of the coating layer was averaged per one micrograph to calculate thickness. This procedure was conducted on at least 50 micrographs, and with the highest ten measurements and the lowest ten measurements omitted, the arithmetic mean of the remaining 30 measurements was counted as coating layer thickness.

(8) Pencil Hardness:

Coating layer hardness was measured according to JIS-K5401 and indicated by pencil hardness.

(9) Coefficient of Friction:

Coefficient of static friction between the front and back sides of the coated film was measured according to the method of ASTM D1894-73.

(10) Evaluation of Anti-curl Properties:

The coated film was cut into a size of 10 cm×10 cm and placed on a horizontal board, and the condition of curling of the test piece was examined. Anti-curl properties were rated according to the following three-rank grading.

Rank A: Absolutely no curling was observed.
Rank B: Inconspicuous, slight curling was noted, but it presented no practical problem.
Rank C: Curling was observed obviously and posed practical problems.

(11) Angle of Contact with Waterdrop:

The angle of contact made by the sample film surface with a distilled water drop was measured in an atmosphere of 23° C. and 50% RH by a contact angle meter Model CA-DT-A mfd. by Kyowa Kaimen Kagaku KK. The contact angle was measured at two points (right and left sides) of the waterdrop with three samples for the total 6 measurements, and the mean value thereof was taken and shown as contact angle. The waterdrop was 2 mm in diameter, and the value of measurement made one minute after dropping water was read.

(12) Peel Strength of Coating Layer with Acrylic Adhesive:

A double-sided adhesive tape ("No. 502" mfd. by Nitto Denko KK) was stuck on the coating layer and pressed by a rubber roller under a linear pressure of 450 g/cm, and the laminate was cut into a 50 mm wide a test piece for measuring peel strength. After allowing the test piece to stand one hour after pressing, the tape was peeled off by pulling it up in the direction of 180° at a pulling speed of 300 mm/min using an Instron tension tester, and the mean value of peel stress was shown as peel strength of the test piece. This test was repeated 10 times, and the arithmetic mean of 10 measurements was taken as peel strength. Each test was conducted in a standard atmosphere of 23° C. and 50% RH.

(13) Transfer Layer Receptivity:

VYLON 200 (produced by Toyo Boseki KK), a thermoplastic polyester, was diluted with a 50/50 mixed solvent of toluene and methyl ethyl ketone and applied on the sample film by gravure coating rolls to a dry coating weight of 0.5 g/m.sup.2. The condition of the coated surface and the condition of adhesion were evaluated as follows. Condition of coated surface of transfer layer:

◯: There was no irregularity of coating.
×: Irregularity of coating was observed.

Adhesion of Transfer Layer

◯: The coating layer could not be easily peeled with hand.
×: The coating layer could be easily peeled with hand.

(14) Transferability of Transfer Layer:

VYLON 200 (produced by Toyo Boseki 1(K), a thermoplastic polyester, was diluted with a 50/50 mixed solvent of toluene and methyl ethyl ketone and applied on the sample film by gravure coating rolls to a dry coating weight of 0.5 g/m.sup.2. A sheet of quality paper was placed on the coated side of this coated film and stuck to each other under a pressure of 0.2 MPa at 100.degree. C. for 3 seconds, and immediately thereafter, the paper was peeled off in the direction of 180.degree. at a rate of 300 mm/mm by a tensile tester in a room of 23.degree. C. and 50% RH. The condition of the film surface after peeling was observed and evaluated as follows.

○: There remained no coating layer on the film surface.

×: Coating layer remained on the film surface.

(15) Coefficient of Friction:

The film was passed round the fixed hard chromium plated metal rolls (6 mm in diameter) at a winding angle of 145° (θ), and with a load of 53 g (T2) being applied to one end, the film was let run at a speed of 1 m/min and the resisting force (T1 (g)) of the other end was measured. The coefficient of friction (μd) was determined from the following equation.

$$\mu d=(1/\theta)\times\ln(T1/T2)=0.424\times\ln(T1/53)$$

(16) Sticking:

A printing test was conducted with the sample film by an OSP label printer TP-80 (mfd. by Osaka Sealing & Printing Co., Ltd.) in an atmosphere of 23° C. and 50% RH, and the condition after 300 meters of run of the film was evaluated as follows.

○: Run of the film was nonstop and there was no deposition of white powder on the thermal head.

×: Run of the film stopped and/or there was seen deposition of white powder on the thermal head.

PREPARATION EXAMPLE 1 (POLYESTER A)

100 parts of dimethyl terephthalate, 60 parts of ethylene glycol and 0.09 part of magnesium acetate tetrahydrate were heated in a reactor to carry out an ester exchange reaction while distilling away methanol. The mixture was heated to 230° C. in 4 hours from start of the reaction to substantially complete the ester exchange reaction. Then an ethylene glycol slurry containing 0.1 part of silica particles having an average size of 1.54 μm was added to the reaction system, after which 0.04 part of ethyl acid phosphate and 0.01 part of germanium oxide were further added, with the temperature reaching 280° C. and the pressure 15 mmHg in 100 minutes. Pressure was still reduced gradually thereafter to finally reach 0.3 mmHg. 4 hours later, the reaction system was returned to normal pressure to obtain polyester A. The content of silica particles in polyester A was 0.1% by weight.

PREPARATION EXAMPLE 2 (POLYESTER FILM A1)

Polyester A was dried in an inert gas atmosphere at 180° C. for 4 hours, melt extruded from a melt extruder at 290° C., and cooled and solidified on a cooling roll with its surface temperature set at 40° C. by making use of the electrostatic pinning method to obtain a non-stretched sheet. This sheet was stretched 3.5 times in the machine direction at 85° C., then stretched 3.7 times in the transverse direction at 100° C. and then heat set at 230° C. to obtain a polyester film A1 having a thickness of 38 μm.

PREPARATION EXAMPLE 3 (POLYESTER FILM A2)

A polyester film A2 having a thickness of 25 μm was obtained in the same way as in Preparation Example 2.

PREPARATION EXAMPLE 4 (POLYESTER FILM A3)

A polyester film A3 having a thickness of 12 μm was obtained in the same way as in Preparation Example 2.

PREPARATION EXAMPLE 5 (POLYESTER FILM A4)

A polyester film A4 having a thickness of 50 μm was obtained in the same way as in Preparation Example 2.

Example 1

55 parts of methyl methacrylate as hydrophobic monomeric unit, 50 parts of an 80% solution of methacryloxyethyltrimethylammonium chloride as cationic monomeric unit, 5 parts of one-terminal methacryloxy-modified organopolysiloxane (FM0721 produced by Chisso Corp.) having a molecular weight of about 5,000 and 140 parts of ethyl alcohol as organopolysiloxane units, and 1 part of azobisisobutyronitrile as polymerization initiator were added to carry out a polymerization reaction in a stream of nitrogen at 80° C. for 6 hours to obtain a 40% ethyl alcohol solution of cationic copolymer. This cationic copolymer was diluted with a 50/50 mixed solvent of ethyl alcohol and isopropyl alcohol, then coated on one side of the polyester film A1 by a bar coater to a dry coating thickness of 0.2 μm, and dried to form a coating layer. An acrylic adhesive was applied on the side of the film opposite from the coating layer and protected with a release film to obtain a laminated film.

Example 2

55 parts of methyl methacrylate as hydrophobic monomeric unit, 40 parts of an 80% solution of methacryloxyethyltriammonium chloride as cationic monomeric unit, 5 parts of a mercapto-modified organopolysiloxane (X-22-980 produced by Shin-Etsu Chemical Co., Ltd.) having a molecular weight of about 7,000 and 150 parts of isopropyl alcohol as organopolysiloxane units, and 1 part of azobisisobutyronitrile as polymerization initiator were added to carry out a polymerization reaction in a stream of nitrogen at 80° C.for 5 hours to obtain a 40% isopropyl alcohol solution of a cationic copolymer. This cationic copolymer was diluted with isopropyl alcohol, coated on one side of the polyester film A1 by a bar coater to a dry coating thickness of 0.15 μm, and then dried to form a coating layer. An acrylic adhesive was applied on the side of the film opposite from the coating layer and protected with a release film to obtain a laminated film.

Example 3

51 parts of methyl methacrylate as hydrophobic monomeric unit, 50 parts of an 80% solution of methacryloxyethyltriammonium chloride as cationic monomeric unit, 4 parts of methacrylic acid, 140 parts of ethyl alcohol, and 1 part of azobisisobutyronitrile were added to carry out a polymerization reaction in a stream of nitrogen at 80° C. for 6 hours, after which 5 parts of a both-terminal epoxy-modified organopolysiloxane (FM5511 produced by Chisso Corp.) having a molecular weight of about 1,000 was added as organopolysiloxane unit, and the mixture was further reacted at 80° C. for 10 hours to obtain a 40% ethyl alcohol solution of a cationic copolymer. This cationic copolymer was diluted with ethyl alcohol, coated on one side of the polyester film A1 by a bar coater to a dry coating thickness of 0.2 μm, and then dried to form a coating layer. An acrylic adhesive was applied on the side of the film opposite from the coating layer and protected with a release film to obtain a laminated film.

Example 4

A mixture of 30 parts of an organopolysiloxane compound (X-22-2440 produced by Shin-Etsu Chemical Co., Ltd.) with a number-average molecular weight of 11,300 having a styrene group at one terminal, 70 parts of N,N-dimethylaminoethyl methacrylate and 150 parts of isopropyl alcohol was heated, to which 0.3 part of azobisisobutyronitrile was added twice, that is, when the temperature reached 80° C. and 2 hours after start of heating, and the mixture was reacted at 80° C. for 8 hours to obtain a copolymer solution with a solids content of 40%. 83.3 parts of isopropyl alcohol was added to the obtained copolymer solution, and then methyl chloride was introduced to the reaction system to proceed with the reaction at 50° C. for 6 hours to obtain a polymer solution (4A) with a solids concentration of 34% having organopolysiloxane units and quaternary ammonium salt units.

Then, 163 parts of a mixture (KAYARAD DPHA produced by Nippon Kayaku KK) of 67 mol % of dipentaerythritol pentaacrylate and dipentaerythritol hexaacrylate, 21.8 parts of pyromellitic acid dianhydride, 100 parts of methyl ethyl ketone, 0.1 part of hydroquinonemonomethyl ether and 1 part of N,N-dimethylbenzylaxnine were added, and the mixture was reacted at 80T for 8 hours to obtain a carboxy group-containing polyfunctional acrylate solution (4B) with a solids concentration of 65%.

17 parts of 4A, 83 parts of 4B, 3 parts of ILGACURE 907 (Ciba Specialty Chemicals) and 897 parts of isopropyl alcohol as photopolymerization initiators were mixed uniformly to prepare an activation energy ray-curing coating composition. This composition was coated on one side of the polyester film A1 to a post-curing thickness of 0.15 $\mu$m and irradiated with a 120 W/cm energy high pressure mercury arc from a distance of 100 mm for 15 seconds to form a coating layer. An acrylic adhesive was applied on the side of the film opposite from the coating layer and protected with a release film to obtain a laminated film.

Example 5

A mixture of 10 parts of an organopolysiloxane compound (X-22-167B produced by Shin-Etsu Chemical Co., Ltd.) with a number-average molecular weight of about 3,340 having mercapto groups at both terminals, 80 parts of N,N-dimethylaminoethyl methacrylate, 10 parts of methyl methacrylate and 150 parts of isopropyl alcohol was heated, to which 0.3 part of azobisbutyronitrile was added twice, viz. when the temperature reached 80° C. and 2 hours after start of heating, and the mixture was reacted at 80° C. for 8 hours to obtain a copolymer solution with a solids content of 40%. 83.3 parts of isopropyl alcohol was added to this copolymer solution, and then methyl chloride was introduced into the reaction system to proceed with the reaction at 50° C. for 6 hours to obtain a polymer solution (5A) with a solids concentration of 35% having organopolysiloxane units and quaternary ammonium salt units.

17 parts of this polymer solution (5A), 53 parts of dipentaerithritol hexaacrylate, 3 parts of ILGACURE 907 (produced by Ciba Specialty Chemicals) and 927 parts of isopropyl alcohol as photopolymerization initiators were mixed uniformly to prepare an activation energy ray-curing coating composition. This coating composition was applied on one side of the polyester film A1 to a post-curing thickness of 0.15 $\mu$m, and irradiated with a 120 W/cm energy high pressure mercury arc from a distance of 100 mm for 5 seconds to form a coating layer. An acrylic adhesive was applied on the opposite side of the film and protected with a release film to obtain a laminated film.

Example 6

A mixture of 15 parts of an organopolysiloxane compound (FM0725 produced by Chisso Corp.) with a number-average molecular weight of about 10,000 having a methacryloyl group at one terminal, 5 parts of N,N-dimethylaminoethyl methacrylate, 10 parts of 2-hydroxylethyl methacrylate and 150 parts of methyl ethyl ketone was heated, to which 0.3 part of azobisisobutyronitrile was added twice, viz. when the temperature reached 80° C. and 2 hours after start of heating, and the mixture was reacted at 80° C. for 8 hours to obtain a copolymer solution with a solids content of 40%. 8 parts of methacryloyl isocyanate was added to this copolymer solution and reacted at 80° C. for 6 hours to obtain a copolymer solution with a solids content of 42% having a methacryloyl group in the side chain. 300 parts of isopropyl alcohol was added to this copolymer solution, and then methyl chloride was introduced into the reaction system to proceed with the reaction at 50° C. for 6 hours to obtain a polymer solution (6A) with a solids concentration of 22% having organopolysiloxane units and quaternary ammonium salt units.

26 parts of this polymer solution (6A), 53 parts of dipentaerithritol hexaacrylate, 3 parts of ILGACURE 907 (produced by Ciba Specialty Chemicals) and 918 parts of isopropyl alcohol as photopolymerization initiators were mixed uniformly to prepare an activation energy ray-curing coating composition. This coating composition was applied on one side of the polyester film A1 and irradiated with a 120 W/cm high-pressure mercury arc from a distance of 100 trim for 15 seconds to form a coating layer. An acrylic adhesive was applied on the opposite side of the film and protected with a release film to obtain a laminated film.

Example 7

A mixture of 10 parts of an organopolysiloxane compound (X-22-2440 produced by Shin-Etsu Chemical Co., Ltd.) with a number-average molecular weight of 11,300 having a styrene group at one terminal, 80 parts of N,N-dimethylaminoethyl methacrylate, 10 parts of 2-hydroxyethyl methacrylate and 150 parts of methyl ethyl ketone was heated, to which 0.3 part of azobisisobutyronitrile was added twice, viz. when the temperature reached 80° C. an 2 hours after start of heating, and the mixture was reacted at 80° C. for 8 hours to obtain a copolymer solution with a solids content of 40%. To this copolymer solution was added 50 parts of a compound obtained by reacting 28 parts of isophorone diisocyanate and 22 parts of 2-hydroxyethyl acrylate, and the mixture was reacted at 80° C. for 6 hours to obtain a copolymer solution with a solids content of 50% having an acryloyl group in the side chain. 300 parts of isopropyl alcohol was added to this copolymer solution, and then methyl chloride was introduced to the reaction system to proceed with the reaction at 50° C. for 6 hours to obtain a polymer solution (7A) with a solids concentration of 28% having organopolysiloxane units and quaternary ammonium salt units.

20 parts of 7A, 53 parts of dipentaerithritol hexaacrylate, 6 parts of DAROCURE 1173 (produced by Ciba Specialty Chemicals) and 921 parts of isopropyl alcohol as photopolymerization initiator were mixed uniformly to prepare an activation energy ray-curing coating composition. This coating composition was applied on one side of the polyester film A1 to a post-curing thickness of 0.15 $\mu$m and irradiated with a 120 W/cm high-pressure mercury arc from a distance of 100 mm for 15-seconds to form a coating layer. An acrylic adhesive was applied on the opposite side of the film and protected with a release film to obtain a laminated film.

Example 8

17 parts of the polymer solution (4A) obtained in Example 4, 53 parts of dipentaerithritol hexaacrylate, and 6 parts of ILGACURE 184 (Ciba Specialty Chemicals) and 924 parts of isopropyl alcohol as photopolymerization initiators were mixed uniformly to prepare an activation energy ray-curing coating composition. This coating composition was applied on one side of the polyester film A1 to a post-curing thickness of 0.15 μm and irradiated with a 120 W/cm high-pressure mercury arc from a distance of 100 mm for 15 seconds to form a coating layer. An acrylic adhesive was applied on the apposite side of the film and protected with a release film to obtain a laminated film.

REFERENTIAL EXAMPLE 1

Sodium p-styrenesulfonate (40 parts), sodium vinylsulfonate (40 parts) and N,N'-dimethylamino methacrylate (20 parts) were dissolved in distilled water. 2,2'-azobis(2-aminodipropane) dihydrochloride was added as polymerization initiator to this solution to carry out polymerization with stirring under heating at 60° C. to obtain an antistatic resin. With 30 parts of this antistatic resin were blended 50 parts of a polyurethane resin (isocyanate moiety: isophorone diisocyanate; polyol moiety: polyester polyol comprising terephthalic acid, isophthalic acid, ethylene glycol and diethylene glycol), 10 parts of an acrylic resin (composing units: methyl methacrylate, N,N'-dimethylaminoethyl methacrylate, 2-hydroxyethyl methacrylate and butyl acrylate), 5 parts of a trifunctional water-soluble epoxy compound, and 5 parts of colloidal silica having an average particle size of 0.1 μm to prepare a water dispersion coating solution.

Then the same procedure as defined in Preparation Example 2 was conducted except that after stretching of the sheet in the machine direction, the said water dispersion coating solution was applied on the sheet to a coating thickness of 0.1 μm after stretching and drying to obtain a polyester film A2. An acrylic adhesive was applied on the side of the polyester film A2 opposite from the water dispersion coating layer and protected with a release film to obtain a laminated film.

REFERENTIAL EXAMPLE 2

60 parts of methyl methacrylate as hydrophobic monomeric unit, 50 parts of an 80% solution of methacryloxyethyltrimethylammonium chloride and 140 parts of ethyl alcohol as cationic monomeric units, and 1 part of azobisisobutyronitrile as polymerization initiator were added to carry out a polymerization reaction in the stream of nitrogen at 80° C. for 6 hours to obtain a 40% ethyl alcohol solution of a cationic copolymer. This cationic copolymer was applied on one side of the polyester film A1 by a bar coater to a post-drying coating thickness of 0.2 μm, and dried to form a coating layer. An acrylic adhesive was applied on the opposite side of the film and protected with a release film to obtain a laminated film.

REFERENTIAL EXAMPLE 3

A mixture of 80 parts of N,N-dimethylaminoethyl methacrylate, 20 parts of methyl methacrylate and 150 parts of isopropyl alcohol was heated, to which 0.3 part of azobisisobutyronitrile was added twice, viz. when the temperature reached 80° C. and 2 hours after start of heating, and the mixture was reacted at 80° C. for 8 hours to obtain a copolymer solution with a solids content of 40%. To this copolymer solution was added 83.3 parts of isopropyl alcohol, and then methyl chloride was introduced to the reaction system to proceed with the reaction at 50° C. for 6 hours to obtain a polymer solution (8A) with a solids concentration of 34% having quaternary ammonium salt units.

17 parts of this polymer solution (8A), 53 parts of dipentaerithritol hexaacrylate, and 3 parts of ILGACURE 907 (produced by Ciba Specialty Chemicals) and 927 parts of isopropyl alcohol as photopolymerization initiators were mixed uniformly to prepare an activation energy ray-curing coating composition. This coating composition was applied on one side of the polyester film A1 to a post-curing coating thickness of 0.15 μm and irradiated with a 120 W/cm high-pressure mercury arc from a distance of 100 mm for 15 seconds to form a coating layer. An acrylic adhesive was applied on the opposite side of the film and protected with a release film to obtain a laminated film.

REFERENTIAL EXAMPLE 4

A mixture of 30 parts of an organopolysiloxane compound (X-22-2440 produced by Shin-Etsu Chemical Co., Ltd.) with a number-average molecular weight of about 11,300 having a styrene group at one terminal of its molecule, 70 parts of methyl methacrylate and 150 parts of isopropyl alcohol was heated, to which 0.3 part of azobisisobutyronitrile was added twice, viz. when the temperature reached 80° C. and 2 hours after start of heating, and the mixture was reacted at 80° C. for 8 hours to obtain a copolymer solution (9A) with a solids content of 40% having organopolysiloxane units.

15 parts of this copolymer solution (9A), 53 parts of dipentaerithritol hexaacrylate, and 3 parts of ILGACURE 907 (produced by Ciba Specialty Chemicals, Ltd.) and 929 parts of isopropyl alcohol as photopolymerization initiator were mixed uniformly to prepare an activation energy ray-curing coating composition. This coating composition was applied on one side of the polyester film A1 and irradiated with a 120 W/cm energy high-pressure mercury arc from a distance of 100 mm for 15 seconds to form a coating layer. An acrylic adhesive was applied on the opposite side of the film and protected with a release film to obtain a laminated film.

The properties of the films obtained in Examples 1 to 8 and Referential Examples 1 to 4 are shown in Tables 1 and 2.

TABLE 1

| Example | 1 | 2 | 3 | 4 | 5 | 6 | 7 | 8 |
|---|---|---|---|---|---|---|---|---|
| Surface resistance (Ω) | $3 \times 10^9$ | $3 \times 10^9$ | $1 \times 10^9$ | $9 \times 10^8$ | $5 \times 10^8$ | $7 \times 10^8$ | $5 \times 10^8$ | $4 \times 10^8$ |
| P2 (mN/cm) | 2100 | 2200 | 2100 | 2200 | 2200 | 2200 | 2200 | 2200 |
| P1 (mN/cm) | 2400 | 2500 | 2400 | 2500 | 2500 | 2500 | 2500 | 2500 |
| P1–P2 (mN/cm) | 300 | 300 | 300 | 300 | 300 | 300 | 300 | 300 |

TABLE 1-continued

| Example | 1 | 2 | 3 | 4 | 5 | 6 | 7 | 8 |
|---|---|---|---|---|---|---|---|---|
| Total light transmittance (%) | 90 | 90 | 90 | 90 | 90 | 90 | 90 | 90 |
| Adhesion of dust | No | No | No | No | No | No | No | No |
| Adherability of adhesive | No | No | No | No | No | No | No | No |

TABLE 2

| Reference Example | 1 | 2 | 3 | 4 |
|---|---|---|---|---|
| Surface resistance (Ω) | $6 \times 10^8$ | $1 \times 10^9$ | $3 \times 10^{11}$ | $>10^{13}$ |
| P2 (mN/cm) | 4000 | 3100 | 2200 | 2200 |
| P1 (mN/cm) | 4300 | 3400 | 2500 | 2500 |
| P1–P2 (mN/cm) | 300 | 300 | 300 | 300 |
| Total light transmittance (%) | 88 | 90 | 90 | 90 |
| Adhesion of dust | No | No | Yes | Yes |
| Adherability of adhesive | Yes | Yes | No | No |

Example 9

The same procedure as defined in Example 4 was conducted except that the activation energy ray-curing coating composition was applied on one side of the polyester film A1 by a gravure coater to a post-curing coating thickness of 2 μm to obtain a laminated film.

Example 10

The same procedure as defined in Example 5 was conducted except that the activation energy ray-curing coating composition was applied on one side of the polyester film A1 by a gravure coater to a post-curing coating thickness of 1.5 μm to obtain laminated film.

Example 11

The same procedure as defined in Example 6 was conducted except that the activation energy ray-curing coating composition was applied on one side of the polyester film A1 by a gravure coater to a post-curing coating thickness of 2 μm to obtain a laminated film.

Example 12

The same procedure as defined in Example 7 was conducted except that the activation energy ray-curing coating composition was applied on one side of the polyester film A1 by a gravure coater to a post-curing coating thickness of 2 μm to obtain a laminated film.

Example 13

The same procedure as defined in Example 8 was conducted except that the activation energy ray-curing coating composition was applied on one side of the polyester film A1 by a gravure coater to a post-curing coating thickness of 2 μm to obtain a laminated film.

Example 14

The same procedure as defined in Example 1 was conducted except that the dilute solution of the cationic copolymer was applied on one side of the polyester film A1 by a gravure coater to a post-curing coating thickness of 2 μm to obtain a laminated film.

Example 15

The same procedure as defined in Example 9 was conducted except that the polyester film A2 was used in place of the polyester film A1 to obtain a laminated film.

Example 16

The same procedure as defined in Example 9 was conducted except that the polyester film A4 was used in place of the polyester film A1 to obtain a laminated film.

REFERENTIAL EXAMPLE 5

The same procedure as defined in Example 9 was conducted except that the polyester film A3 was used in place of the polyester film A1 to obtain a laminated film.

REFERENTIAL EXAMPLE 6

The same procedure as defined in Referential Example 2 was conducted except that the dilute solution of the cationic copolymer was applied on one side of the polyester film A1 by a gravure coater to a post-curing coating thickness of 2 μm to obtain a laminated film.

REFERENTIAL EXAMPLE 7

The same procedure as defined in Referential Example 3 was conducted except that the activation energy ray-curing coating composition was applied on one side of the polyester film A1 by a gravure coater to a post-curing coating thickness of 2 μm to obtain a laminated film.

REFERENTIAL EXAMPLE 8

The same procedure as defined in Referential Example 4 was conducted except that the activation energy ray-curing coating composition was applied on one side of the polyester film A1 by a gravure coater to a post-curing coating thickness of 2 μm to obtain a laminated film.

The properties of the films obtained Examples 9 to 16 and Referential Examples 5 to 8 are shown in Tables 3 and 4.

TABLE 3

| Example | 9 | 10 | 11 | 12 | 13 | 14 | 15 | 16 |
|---|---|---|---|---|---|---|---|---|
| Surface resistance (Ω) | $3 \times 10^9$ | $3 \times 10^9$ | $1 \times 10^9$ | $9 \times 10^8$ | $5 \times 10^8$ | $7 \times 10^8$ | $5 \times 10^8$ | $4 \times 10^8$ |
| Pencil hardness | 2H | 2H | 2H | 2H | 2H | 2H | 2H | 2H |

TABLE 3-continued

| Example | 9 | 10 | 11 | 12 | 13 | 14 | 15 | 16 |
|---|---|---|---|---|---|---|---|---|
| Coefficient of friction | 0.14 | 0.14 | 0.13 | 0.14 | 0.14 | 0.24 | 0.13 | 0.13 |
| Film thickness ($\mu$m) | 38 | 38 | 38 | 38 | 38 | 38 | 25 | 50 |
| Coating layer thickness ($\mu$m) | 2 | 1.5 | 2 | 2 | 2 | 2 | 2 | 2 |
| Adhesion of dust | No | No | No | No | No | No | No | No |
| Evaluation of anti-curl properties | A | A | A | A | A | A | B | A |
| Total light transmittance (%) | 90 | 90 | 90 | 90 | 90 | 90 | 90 | 90 |

TABLE 4

| Reference Example | 5 | 6 | 7 | 8 |
|---|---|---|---|---|
| Surface resistance ($\Omega$) | $6 \times 10^8$ | $1 \times 10^9$ | $3 \times 10^{11}$ | $>10^{13}$ |
| Pencil hardness | 2H | H-2H | 2H | 2H |
| Coefficient of friction | 0.14 | 0.48 | 0.32 | 0.14 |
| Film thickness ($\mu$m) | 12 | 38 | 25 | 50 |
| Coating layer thickness ($\mu$m) | 2 | 2 | 2 | 2 |
| Adhesion of dust | No | No | Yes | Yes |
| Evaluation of anti-curl properties | C | A | A | A |
| Total light transmittance (%) | 91 | 90 | 90 | 90 |

Example 17

The same procedure as defined in Example 1 was conducted except for the omission of the steps of applying an acrylic adhesive on the opposite side (the side opposite from the coating layer) of the film and protecting it with a release film to obtain a laminated film.

Example 18

The same procedure as defined in Example 2 was conducted except for the omission of the steps of applying an acrylic adhesive on the opposite side of the film and protecting it with a release film to obtain a laminated film.

Example 19

The same procedure as defined in Example 3 was conducted except for the omission of the steps of applying an acrylic adhesive on the opposite side of the film and protecting it with a release film to obtain a laminated film.

Example 20

The same procedure as defined in Example 4 was conducted except for the omission of the steps of applying an acrylic adhesive on the opposite side of the film and protecting it with a release film to obtain a laminated film.

Example 21

The same procedure as defined in Example 5 was conducted except for the omission of the steps of applying an acrylic adhesive on the opposite side of the film and protecting it with a release film to obtain a laminated film.

Example 22

The same procedure as defined in Example 6 was conducted except for the omission of the steps of applying an acrylic adhesive on the opposite side of the film and protecting it with a release film to obtain a laminated film.

Example 23

The same procedure as defined in Example 7 was conducted except for the omission of the steps of applying an acrylic adhesive on the opposite side of the film and protecting it with a release film to obtain a laminated film.

Example 24

The same procedure as defined in Example 8 was conducted except for the omission of the steps of applying an acrylic adhesive on the opposite side of the film and protecting it with a release film to obtain a laminated film.

REFERENTIAL EXAMPLE 9

The same procedure as defined in Referential Example 1 was conducted except for the omission of the steps of applying an acrylic adhesive on the opposite side of the film and protecting it with a release film to obtain a laminated film.

REFERENTIAL EXAMPLE 10

The same procedure as defined in Referential Example 2 was conducted except for the omission of the steps of applying an acrylic adhesive on the opposite side of the film and protecting it with a release film to obtain a laminated film.

REFERENTIAL EXAMPLE 11

A coating solution comprising 100 parts of a curable silicone resin (KS-723A available from Shin-Etsu Chemical Industries Co., Ltd.), 25 parts of another curable silicone resin (KS-723B available from Shin-Etsu Chemical Industries Co., Ltd.), 5 parts of a curing agent (CATPS-3 available from Shin-Etsu Chemical Industries Co., Ltd.) and 2,200 parts of a 50/50 mixed solvent of methyl ethyl ketone and toluene was applied on one side of the polyester film A3 to a post-curing coating thickness of 0.1 $\mu$m, then dried and cured by heating to form a coating layer.

REFERENTIAL EXAMPLE 12

The same procedure as defined in Referential Example 4 was conducted except for the omission of the steps of applying an acrylic adhesive on the opposite side of the film and protecting it with a release film to obtain a laminated film.

The properties of the films obtained in Examples 17 to 24 and Comparative Examples 9 to 12 are shown in Tables 5 and 6.

TABLE 5

| Example | 17 | 18 | 19 | 20 | 21 | 22 | 23 | 24 |
|---|---|---|---|---|---|---|---|---|
| Surface resistance (Ω) | $3 \times 10^{10}$ | $3 \times 10^{10}$ | $1 \times 10^{10}$ | $9 \times 10^{9}$ | $5 \times 10^{9}$ | $7 \times 10^{9}$ | $5 \times 10^{9}$ | $4 \times 10^{9}$ |
| Angle of contact with waterdrop (°) | 81 | 80 | 81 | 80 | 80 | 80 | 80 | 80 |
| Peel strength (mN/cm) | 2100 | 2200 | 2100 | 2200 | 2200 | 2200 | 2200 | 2200 |
| Condition of coated surface of transfer layer | ◯ | ◯ | ◯ | ◯ | ◯ | ◯ | ◯ | ◯ |
| Adhesion of transfer layer | ◯ | ◯ | ◯ | ◯ | ◯ | ◯ | ◯ | ◯ |
| Transferability of transfer layer | ◯ | ◯ | ◯ | ◯ | ◯ | ◯ | ◯ | ◯ |
| Coefficient of friction | 0.14 | 0.14 | 0.13 | 0.14 | 0.14 | 0.24 | 0.13 | 0.13 |
| Sticking | ◯ | ◯ | ◯ | ◯ | | | | |

TABLE 6

| Reference Example | 9 | 10 | 11 | 12 |
|---|---|---|---|---|
| Surface resistance (Ω) | $6 \times 10^{9}$ | $1 \times 10^{10}$ | $>10^{13}$ | $>10^{13}$ |
| Angle of contact with waterdrop (°) | 67 | 72 | 110 | 82 |
| Peel strength (mN/cm) | 4000 | 3100 | 40 | 2200 |
| Condition of coated surface of transfer layer | ◯ | ◯ | X | X |
| Adhesion of transfer layer | ◯ | ◯ | X | ◯ |
| Transferability of transfer layer | X | X | ◯ | ◯ |
| Coefficient of friction | 0.14 | 0.48 | 0.32 | 0.14 |
| Sticking | X | X | X | X |

What is claimed is:

1. A polarizing plate protective base film comprising a laminated film comprising a biaxially oriented polyester film and a coating layer provided on one side of said biaxially oriented polyester film,
   the coating layer comprises a cationic copolymer comprising cationic monomeric units, hydrophobic monomeric units and organopolysiloxane units,
   the surface electrical resistance of said coating layer being not more than $1 \times 10^{11} \Omega$,
   the adhesive force (P2) of the coating layer surface with an acrylic adhesive being not more than 3,000 mN/cm, and
   the difference between adhesive force (P1) of the coating layer surface with a rubber adhesive and adhesive force (P2) with an acrylic adhesive (P1–P2) being not less than 100 mN/cm.

2. A base film according to claim 1, wherein the coating layer contains an antistatic agent.

3. A base film according to claim 1, wherein the coating layer contains a silicone compound.

4. A base film according to claim 1, wherein thickness of the coating layer is 0.01 to 0.3 μm.

5. A base film according to claim 1, wherein an adhesive layer is laminated on the side of the film opposite from the coating layer.

6. A base film according to claim 5, wherein the adhesive layer is composed of a material selected from the group consisting of acrylic adhesives, rubber adhesives, block copolymer adhesives, polyisobutylene adhesives, silicone adhesives or mixtures thereof.

7. A base film according to claim 5, wherein a release film is laminated on the surface of the adhesive layer.

8. A base film according to claim 1, wherein the cationic monomeric units contain quaternary ammonium base in the unit.

9. A base film according to claim 8, wherein the cationic monomeric units are represented by the following formula (a):

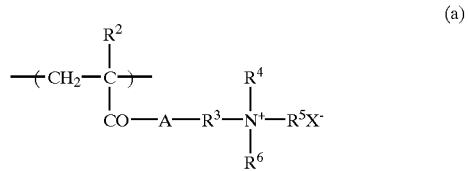

(a)

wherein A represents O or NH; $R^2$ represents hydrogen or $CH_3$; $R^3$ represents a $C_2$–$C_4$ alkylene group or $-CH_2CH(OH)CH_2-$; $R^4$, $R^5$, and $R^6$ may be identical or different and represent independently a $C_1$–$C_{10}$ alkyl or aralkyl group; and X represents a halogen or an alkylsulfuric acid ion.

10. A base film according to claim 1, wherein the hydrophobic monomeric units are selected from the group consisting of alkyl (meth)acrylates, styrenes and vinyl esters.

11. A base film according to claim 1, wherein the organopolysiloxane units are represented by the following formula (b):

(b)

wherein each occurrence of $R^1$ may be the same or different and represent independently a $C_1$–$C_{10}$ alkyl or phenyl group, and n is an integer of 5 or more.

12. A base film according to claim 1, wherein the cationic copolymer comprises 15 to 60% by weight of cationic monomeric units, 30 to 84.9% by weight of hydrophobic monomeric units and 0.1 to 20% by weight of organopolysiloxane.

* * * * *